United States Patent
Ginocchio et al.

(10) Patent No.: US 9,279,952 B2
(45) Date of Patent: Mar. 8, 2016

(54) WATER-BLOCKED OPTICAL CABLE AND PROCESS FOR THE PRODUCTION THEREOF

(75) Inventors: Alessandro Ginocchio, Sesto San Giovanni (IT); Enrico Consonni, Milan (IT); Paolo Arturo Presa, Caldiero (IT); Massimo Pizzorno, Milan (IT); Mauro Maritano, Milan (IT)

(73) Assignee: PRYSMIAN CAVI E SISTEMI ENERGIA S.R.L., Milan (IT)

( * ) Notice: Subject to any disclaimer, the term of this patent is extended or adjusted under 35 U.S.C. 154(b) by 736 days.

(21) Appl. No.: 12/947,544

(22) Filed: Nov. 16, 2010

(65) Prior Publication Data

US 2011/0089588 A1    Apr. 21, 2011

Related U.S. Application Data

(62) Division of application No. 11/666,757, filed as application No. PCT/EP2004/012631 on Nov. 5, 2004, now Pat. No. 7,860,361.

(51) Int. Cl.
  *G02B 6/04* (2006.01)
  *G02B 6/44* (2006.01)
  *G02B 6/10* (2006.01)

(52) U.S. Cl.
  CPC ............. *G02B 6/4494* (2013.01); *G02B 6/441* (2013.01)

(58) Field of Classification Search
  CPC .............................. G02B 6/4494; G02B 6/441
  See application file for complete search history.

(56) References Cited

U.S. PATENT DOCUMENTS 4,256,051 A * 3/1981 Landsness ................... 118/107
4,331,379 A * 5/1982 Oestreich ............ G02B 6/4401
                                                    385/109

(Continued)

FOREIGN PATENT DOCUMENTS

JP           62-222214      9/1987
WO       WO 00/58768      10/2000

OTHER PUBLICATIONS

DICT.org definition of "optical Fiber".*

(Continued)

*Primary Examiner* — Alison Hindenlang
*Assistant Examiner* — Jerzi H Moreno Hernandez
(74) *Attorney, Agent, or Firm* — Finnegan, Henderson, Farabow, Garrett & Dunner, L.L.P.

(57) ABSTRACT

An optical cable for communication includes at least one retaining element blocked with respect to the water propagation as well as a process for manufacturing such an optical cable. The optical cable includes, in addition to the retaining element, at least two transmission elements housed within the retaining element and a water swellable yarn housed within the retaining element. The water swellable yarn is selected according to the following equation:

$$\frac{V_w}{V_{TF}} = \frac{k}{V_t} + R \quad (I)$$

in which $V_w$ is the volume of the water swellable yarn after swelling upon contact with water; $V_{TF}$ is the total free volume in the retaining element; k is a constant≥180; R is a constant≥1.4; and $V_t$ is the free volume per each transmission element. Advantageously, the optical cable is water-blocked and the water swellable yarn does not induce microbending effects on the transmission elements.

7 Claims, 4 Drawing Sheets

(56) References Cited

U.S. PATENT DOCUMENTS

| | | | |
|---|---|---|---|
| 4,909,592 A | 3/1990 | Arroyo et al. | |
| 5,155,789 A | 10/1992 | Le Noane et al. | |
| 5,157,752 A | 10/1992 | Greveling et al. | |
| 5,173,204 A * | 12/1992 | Chiddick et al. | 508/167 |
| 5,536,528 A * | 7/1996 | Tanaka | G02B 6/4491 156/48 |
| 5,698,615 A | 12/1997 | Polle | |
| 5,751,879 A * | 5/1998 | Graham | G02B 6/441 174/107 |
| 6,205,277 B1 * | 3/2001 | Mathis et al. | 385/106 |
| 6,295,401 B1 * | 9/2001 | Rutterman et al. | 385/114 |
| 6,631,229 B1 | 10/2003 | Norris et al. | |
| 6,633,709 B2 | 10/2003 | Van Vickle et al. | |
| 6,738,547 B2 * | 5/2004 | Spooner | 385/101 |
| 7,302,143 B2 | 11/2007 | Ginocchio et al. | |
| 7,435,909 B2 | 10/2008 | Hager et al. | |
| 2002/0025127 A1 * | 2/2002 | Graham et al. | 385/102 |
| 2002/0197030 A1 * | 12/2002 | McAlpine | G02B 6/440 385/103 |
| 2003/0026559 A1 | 2/2003 | Van Vickle et al. | |
| 2003/0059181 A1 | 3/2003 | Jackman et al. | |
| 2003/0168243 A1 | 9/2003 | Jamet et al. | |
| 2003/0215198 A1 | 11/2003 | Newton et al. | |
| 2004/0050584 A1 | 3/2004 | Hager et al. | |
| 2004/0065457 A1 | 4/2004 | Hager et al. | |
| 2004/0252954 A1 | 12/2004 | Ginocchio et al. | |
| 2006/0045439 A1 | 3/2006 | Brown et al. | |
| 2008/0280051 A1 | 11/2008 | Hager et al. | |

OTHER PUBLICATIONS

Summons to Attend Oral Proceedings Pursuant to Rule 115(1) EPC by the European Patent Office in corresponding European Patent No. 04803113.2 dated Oct. 13, 2011 (6 pages).

Communication enclosing Extended Search Report mailed by the European Patent Office on Sep. 22, 2011 in corresponding European Patent Application No. EP 10 01 2056.7 (6 pages).

Communication from European Patent Office titled "Communication Pursuant to Article 94(3) EPC" dated Jun. 28, 2012 (5 pages).

Brazilian Search Report and Office Action re PCT/EP2004/012631 dated Jul. 17, 2014.

* cited by examiner

WATER-BLOCKED OPTICAL CABLE AND PROCESS FOR THE PRODUCTION THEREOF

CROSS REFERENCE TO RELATED APPLICATION

This is a division of application Ser. No. 11/666,757, filed Mar. 27, 2008 now U.S. Pat. No. 7,860,361, which is a National Phase Application based on PCT/EP2004/012631, filed Nov. 5, 2004, both of which are incorporated herein by reference.

FIELD OF THE INVENTION

The present invention relates to an optical cable comprising at least one retaining element blocked with respect to the water propagation.

The present invention also relates to a process for manufacturing such an optical cable.

STATE OF THE ART

In an optical cable, the transmission elements are, typically, optical fibers. The optical fibers generally comprise a silica glass "core+cladding" transmitting element and an outer single or composite polymeric layer (protecting coating) advantageously including a colored layer for identification.

The optical cable typically comprises buffering elements in radially external position with respect to the optical fibers, providing functions such as mechanical isolation, protection from physical damage and fiber identification.

For instance, one or more optical fibers, e.g. arranged in group, bundle or ribbon, can be housed in a tube or flexible sheath (hereinafter referred to as "retaining element") of polymeric material endowed with specific mechanical properties (such as Young modulus, tensile strength and elongation at break) in order to ensure an adequate protection to the fibers.

The optical fiber/retaining element assembly is generally referred to as "optic unit".

Among the optical cables in which the optical fiber(s) are housed in a tubular retaining element, there are cables in which the optical fiber(s) are inserted in a tube, sometimes called "buffer tube" or "loose tube", providing fiber protection and identification. The retaining element of this kind of optic unit usually has a thickness higher than about 0.2 mm, typically of from about 0.3 mm to about 0.8 mm, and an inner diameter of 1.6-1.8 mm, when contains twelve optical fibers.

In a specific type of tubular type optical cable, the optical units have reduced dimensions both in term of diameter and sheath thickness. Typically, the optical units are called "micromodules", and the retaining element thereof is generally referred to as "microsheath" or "minisheath". In this case, the retaining element material is particularly designed for allowing the identification of fibers or of groups of fibers, and for achieving an easy access to the optical fibers, e.g. by simply tearing and slipping off the retaining element, in order to facilitate both the connection between the optical fibers and the system equipment or the interconnection between cables. The microsheath is typically made of a material having a relatively low modulus of elasticity and ultimate elongation, such as PVC, ethyl-vinyl acetate (EVA) and polyethylene. Advantageously, the use of the above materials for forming a thin microsheath also results in a microsheath that is easier to remove or to strip, just using fingers or fingernails. In a typical micromodule optical cable, a retaining element containing twelve optical fibers has an inner diameter of about 1.1 mm, and a thickness of 0.2 mm or less, for example 0.15 mm.

A micromodule optical cable is known, for instance, from WO00/58768 (in the Applicant's name), and comprises a number of micromodules, an inner tube surrounding the micromodules and an external sheath covering the inner tube. The micromodules can optionally and advantageously show different colors to be distinguished one another.

U.S. Pat. No. 5,155,789 (in the name of Société Industrielle de Liaisons Électriques SILEC and État Français (Centre National d'Étude des Télécommunications—CNET) provides a telecommunication cable comprising optical fibers split into modules, each module being enveloped in a thin supporting sheath that is easily torn, wherein the supporting sheaths are in contact with the optical fibers to clamp them together.

The arrangement of the optical fibers in micromodules as defined above allows employing a high number of optical fibers in a relatively small optical cable. The micromodule arrangement can provide, e.g., up to 144 optical fibers in an optical cable having a diameter lower than or equal to 13 mm this diameter is not comprehensive of additional protecting layers optionally provided for specific purposes and requirements), making such a cable particularly suitable for urban distribution networks.

In the present description and claims, "blocked with respect to the water propagation" means that the water propagation, mainly intended as a spreading along the longitudinal direction of the micromodule as a consequence of a damage to the cable integrity, which results in a progressive filling thereof, is substantially prevented or limited. Both the micromodule and the cable containing it should fulfill the requirements of the test according to method F5B provided by international standard IEC 60794-1-2: further details regarding this test will be provided hereinafter.

Typically, each micromodule can comprise from 2 to 12 optical fibers housed in a retaining element as from above.

The intrusion of water or humidity into an optical cable or a micromodule, and the consequent propagation therethrough can be a problem. Water entering in the micromodule can migrate through it impairing the transmission properties of the optical fibers housed therein. Also, water can reach and degrade closure or other termination device and/or can damage electronics mounted within the closure or other termination device.

Methods are known for preventing such propagation. For example, micromodules and cables comprising the same are known which are water-blocked by means of filling material included in different passageways. More particularly, a filler material can be included in the retaining element of each micromodule among the optical fibers contained therein.

US 2003/0168243 (Jamet et al.) relates to a telecommunication cable including a plurality of modules which each have a thin retaining sheath clamping optical fibers together, and a jacket around the modules is characterized in that it comprises retaining sheaths which each contain a plurality of respective modules and each of which is mechanically coupled to the retaining sheaths of the respective modules to form supermodules in contact with the jacket.

A filler material, e.g. a sealing product such as silicone or synthetic grease, oil or gel, or a "dry" product obtained by associating swelling powder and/or swelling filaments and/or swelling tapes that swell in the presence of water to form a stopper that prevents water propagation can be provided inside the micromodule.

As pointed out, for example, by U.S. Pat. No. 5,157,752 (in the name of Northern Telecom Ltd.), there are problems associated with the use of greases or gels. For instance, such materials are difficult and costly to apply into and fill cable passageways. Grease or gel also makes it difficult and unpleasant to handle the fibers during installation or repair of a cable, and at low temperatures (e.g. below 0° C.) change in viscosity of the grease or gel surrounding and contacting fibers may increase signal attenuation in the fibers. A further problem is that since greases or gels may be incompatible with economically desirable plastics, which could normally be extruded as tubes for containing the fibers, more expensively engineered polymers may be required for the tubes.

The use of a "dry" product could circumvent the problems associated with gel and grease.

The above-mentioned U.S. Pat. No. 5,157,752 discloses an optical cable defining an axially extending passageway and an optical fiber means and a water blocking means disposed within and extending along the passageway, the water blocking means comprising an elongate element which swells upon contact with water to block the passageway against the flow of water.

The Applicant observed that the choice of the "dry" water swellable material, e.g. a water swellable yarn or a water swellable powder optionally supported on an elongated carrier, for obtaining a micromodule blocked with respect to the water propagation, is a problem.

The water swellable material has to coexist with the optical fibers without causing damages thereto. For example, stresses arising from the contact with the water swellable material can induce microbending in the optical fibers and impair the transmission performance thereof.

In particular, the Applicant observed that commercially available water swellable powders, dispersed among optical fibers or supported, e.g., by a filament provided inside the retaining element, may efficiently prevent the water propagation along the micromodule, but, due to their grain size, typically of micrometer order of magnitude or larger, can impair the optical fiber transmission properties by microbending. The powder can also yield agglomerates exacerbating the microbending phenomenon.

The Applicant also observed that the grinding of said powders to decrease their grain size spoils their swelling capability. On the other side, powders with grain size in the nanometer order, either obtained by grinding or by processes other than grinding, give rise to problems connected with cost and handling during the cable production, and with health for the operators.

In addition, Applicant observed that a uniform and controlled physical distribution of such powders inside the micromodule is difficult to be obtained from the industrial point of view.

Water swellable yarns have been considered as an alternative to the water swellable powder.

In the present description and claims, as "water swellable yarn" it is intended a water swellable tape or filament optionally supported by or stranded with a filamentary carrier, or a filament covered with a water swellable non-powdery material, e.g. a water swellable polymer emulsion.

The already reported U.S. Pat. No. 5,157,752 proposes that, if the diameter of the passageway should be greater than two or more water swellable elongate elements should be included with the fibers as required.

U.S. Pat. No. 6,633,709 (in the name of Sumitomo Electric Lightware Corp.) relates to a cable comprising a plurality of stacked fiber optic ribbons having a plurality of water blocking yarns extending generally along the length of the stack of fiber optic ribbons and positioned around at least a portion of the circumference of the stack wherein the plurality of water blocking yarns possess water swellable characteristics. The stack of fiber optic ribbons and the plurality of water blocking yarns extending along the length of the stack of fiber optic ribbons are all loosely disposed in a buffer tube having an interior channel larger than the stack of fiber optic ribbons. The swell capacity of the plurality of water blocking yarns should exceed the critical mass of water that could enter the buffer tube by a factor of 2.0 or more. The swell capacity is determined as a function of the number of water blocking yarns, the yarn denier and the absorbency that, in turn, is given as a function of the yarn denier and expressed as swell mass per yarn mass. Thus, for a given number of yarns N, of denier d, and absorbency B the total capacity of water absorption expressed in mass per unit length. The critical mass of water is determined as a function of the open area of the buffer tube and the water density.

The Applicant observes that neither the diameter of the retaining element, nor its arrangement in term of number of fibers housed therein is considered in this document.

SUMMARY OF THE INVENTION

The Applicant has noticed that the water swellable yarn should, preferably, not only offer an adequate water swelling capacity for preventing the water propagation inside the micromodule, but also should show a number of physical features of not minor importance for the good manufacturing and operation of the cable, further to be dimensionally compatible with the retaining element size and the number of optical fibers housed therein.

More particularly, the water swellable yarn should, preferably:
a) show a surface as smooth as to avoid friction against the optical fiber, which can give rise to microbending; typically, frictions can occur during the cable manufacturing process, installation and life;
b) have a thermal dimensional stability throughout the operating thermal range of the cable so as not to cause stresses to the optical fibers;
c) show mechanical properties suitable with the manufacturing process of the optical cable, in particular ultimate tensile strength;
d) have an effective water absorption in term of both swelling volume and rate of swelling reaction.

The Applicant found that among the above mentioned properties, the dimensional sizing and the swelling characteristics are particularly important for preventing water propagation along the micromodule to such an extent to make the micromodule fulfill with the requirement of the international standard.

Within the present invention, the Applicant perceived that when the retaining element has a reduced internal volume, in particular in case of micromodules, i.e. when the retaining element is closely packed with optical fibers and water swellable yarn, the swelling capacity in term of volume increase of the water swellable yarn is hindered and, as a consequence, the ability of preventing the water propagation along the micromodule is impaired.

The Applicant found that the water propagation in an optical cable and in a micromodule containing optical fibers can be controlled below a critical value, without introducing microbending effects, by using a water swellable yarn arranged together and in contact with said optical fibers. In particular the water swellable yarn is characterized by a swelling volume in a predetermined relationship with the free volume per fiber within the micromodule.

In other words, the Applicant found that the ability of preventing water propagation depends not only on the relationship of the swelling volume with the free volume within the retaining element, but also on the relationship with the number of transmission elements housed within the retaining element.

According to another aspect, the Applicant found that the presence of mechanical stresses during the manufacturing of the cable may cause difficulties.

Stresses can be generated during the step of bundling together the transmission elements and the water swellable yarn in the manufacturing of the cable. In particular, the presence of a significant difference between the traction resistance of the water swellable yarn and that of the transmission elements may bring to ruptures or damages of one of them, or difficulties and irregularities of bundling.

In addition, since the retaining element is typically produced by extrusion, there is the possibility of adhesion of transmission elements and water swellable yarn to the inner wall of the retaining element, particularly before the cooling of the latter has been completed.

Such adhesion may limit the freedom of movement of the transmission elements during both the manufacturing and use of the cable, for example in connection with cable laying, thermal excursions and the like.

The Applicant found that a powdery anti-friction agent enables to prevent such stresses, without requiring the use of fluid lubricants.

In particular, talc has been found suitable for providing the desired anti-friction effect without causing microbending phenomena.

In a first aspect, the present invention relates to an optical cable for communication comprising:
 a retaining element;
 at least two transmission elements housed within said retaining element; and
 a water swellable yarn housed within said retaining element;
wherein the water swellable yarn is selected according to the following equation:

$$\frac{V_w}{V_{TF}} = \frac{k}{V_t} + R \quad (1)$$

in which $V_w$ is the volume of the water swellable yarn after swelling upon contact with water;
 $V_{TF}$ is the total free volume in the retaining element;
 k is a constant≥180
 R is a constant≥1.4; and
 $V_t$ is the free volume per each transmission element.

For the purpose of the present description and of the claims which follow, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

According to the present description and claims, the volumes of the transmission elements, of the water swellable yarn and of the retaining element of the invention are intended as volume per length unit, e.g. $mm^3/m$ and are calculated on the basis of the area of their cross-section. In the case of the retaining element, the inner volume $V_i$ is calculated on the basis of the inner area of the cross-section.

In one embodiment of the present invention, the retaining element has a thickness of from 0.3 to 0.8 mm, and is hereinbelow indicated as "loose tube". In this type of retaining element, the transmission elements may be provided in bundles, in ribbons or in both of such configuration.

In another embodiment of the present invention, the retaining element has a thickness of 0.2 mm or less, for example 0.15 mm, and is hereinbelow indicated as "micromodule". Within each micromodule, the transmission elements may be arranged with or without clearance. As "clearance" it is herein intended, a difference between the inner diameter of the retaining element and the diameter of the smallest circle enveloping the transmission elements equal to or greater than 1%.

If no clearance is left between the optical fibers and the retaining element, the micromodule is called "tight", while a micromodule is called "of the loose type" when said clearance is present. At clearance value≥1%, preferably up to 30%, for a suitable length of a micromodule (e.g. 1 m) it is possible to extract a single optical fiber independently of the others.

Preferred according to the present invention is a micromodule of the loose type.

The total free volume $V_{TF}$ is the volume inside the retaining element left vacant after the insertion of the transmission elements. It is defined according to the following relationship:

$$V_{TF} = \lfloor V_i - (V_f \times m) \rfloor \quad (2)$$

wherein m is the number of transmission elements;
 $V_i$ is the inner volume of the retaining element; and
 $V_f$ is the volume of a single transmission element.

Advantageously, the retaining element is made of a polymeric material.

Suitable materials, according the specific needs, include: α-olefin polymers and copolymers, such as low density polyethylene (LDPE), high density polyethylene (HDPE), linear low density polyethylene (LLDPE), ultra low density polyethylene (ULDPE); polypropylene; high and low density poly-1-butene; poly-4-methyl-1-pentene; ultra; poly-4-methyl-1-pentene; ethylene propylene copolymers; ethylene-propylene-diene copolymers (EPDM); ethylene-1-butylene copolymer, ethylene-vinyl acrylate copolymer, ethylene-methyl acrylate copolymer, ethylene-butyl acrylate copolymer, ethylene-ethyl acetate copolymer, ethylene-vinyl acetate copolymer, propylene-4-methyl-1-pentene copolymer, ethylene-vinyl alcohol copolymer; ethylene-methyl acrylate-acrylic acid terpolymers; or mixtures thereof. Halogenated olefins, polymers and copolymers, may also be used, when absence of halogens is not required. Ethylene-butyl acrylate copolymer, linear low density polyethylene (LLDPE), or mixtures thereof, are preferred.

Advantageously, an inorganic filler (b) is added to the polymeric material. The inorganic filler can include, for example, magnesium hydroxide, aluminum hydroxide, aluminum oxide, kaolin, alumina trihydrate, magnesium carbonate hydrate, magnesium carbonate, magnesium calcium carbonate hydrate, magnesium calcium carbonate, or mixtures thereof. Magnesium hydroxide, aluminum hydroxide, alumina trihydrate ($Al_2O_3 \cdot 3H_2O$), or mixtures thereof, are particularly preferred.

Other additives, such as processing coadjuvants, lubricants, pigments, other fillers, may advantageously be added to the polymeric material.

As inner volume $V_i$ of the retaining element it is herein intended the volume per unit length confined within the retaining element. Preferably, the inner volume $V_i$ is calculated on an inner diameter of from 1 mm to 1.2 mm. Preferably, the retaining element has an outer diameter of form 1.3 mm to 1.5 mm.

As $V_f$ it is herein intended the volume per unit length of one transmission element. Typically, in the case of optical fibers as transmission elements, their individual diameter of about 0.25 mm. Preferably the number of transmission elements is from 4 to 12.

The transmission elements can be arranged substantially parallel or, preferably, according to an open helix pattern (or SZ stranding) around the longitudinal axis of the micromodule, i.e. the transmission elements are stranded around said axis in sections with a first stranding direction (S-shaped) alternating with sections with an opposite stranding direction of (Z-shaped).

The free volume $V_t$, hereinafter also referred to as "free volume per fiber" is defined according the following:

$$V_t = \frac{V_{TF}}{m} = \frac{\lfloor V_i - (V_f \times m) \rfloor}{m} \quad (3)$$

Advantageously, the water swellable yarn has a swelling time equal to or less then 2 minutes, as swelling time being intended the time for reaching at least 90% of the maximum expansion upon contact with water.

Examples of water swellable yarn useful for the present invention are polyacrylate filaments or fibers optionally associated to polyester filaments or threads, and aromatic polyamide filaments or threads coated with a super-absorbent polymer, such as a polyacrylate.

According to the invention, the volume $V_w$ of the water swellable yarn (hereinafter also referred to as "swelling volume") is selected according to the equation (1). The selection of $V_w$ is correlated to the number of transmission elements intended to be housed in the retaining element, and to the free volume per fiber $V_t$ of the retaining element, as apparent by substituting $V_{TF}$ in equation (1) with $V_t \cdot m$ according to equation (3) so to have:

$$\frac{V_w}{V_t \times m} = \frac{k}{V_t} + R \quad (4)$$

By multiplying (4) for $V_t \cdot m$, it is obtained:

$$V_w = (k \times m) + (R \times V_t \times m) \quad (5)$$

According to another aspect, the present invention relates to a process for manufacturing an optical cable comprising a retaining element housing at least two transmission elements and a water swellable yarn, said process comprising the steps of:
- associating the transmission elements and the water swellable yarn together to form a bundle;
- extruding the retaining element around said bundle;

wherein the step of associating the transmission elements and the water swellable yarn together comprises the step of applying a powdery anti-friction agent over the transmission elements.

In the present description and claims, as "anti-friction agent" is meant an agent capable of reducing the friction and/or preventing the sticking among the bundle components, i.e. transmission elements and water swellable yarn, and of the bundle components to the retaining element.

According to the present process, the application of an anti-friction agent in powdery form avoids the problems already mentioned above in connection with water blocking greases or gels. Conveniently, the powdery anti-friction agent should fulfill the specification of being non-hygroscopic and non-nutritive to fungus.

Preferably, in the process of the invention the step of associating the transmission elements and the water swellable yarn together comprises the step of stranding the transmission elements and the water swellable yarn. Advantageously, said stranding step is an SZ stranding step.

Advantageously, the stranding step is effected after the step of applying a powdery anti-friction agent.

Advantageously, the step of applying a powdery anti-friction agent comprises the step of advancing together the transmission elements through a powdery anti-friction agent applicator.

Advantageously, the step of applying a powdery anti-friction agent comprises the step of shielding the water swellable yarn from powdery anti-friction agent application. For example, the shielding step can be effected by advancing the water swellable yarn through a shielding tube positioned inside the powdery anti-friction agent applicator. The shielding step is preferred when the application of a powdery anti-friction agent on the water swellable yarn could impair the proper conformation of the optical unit because the water swellable yarn, in view of the features thereof, could drag an excessive amount of powder.

Advantageously, the powdery anti-friction agent applicator is provided with a pneumatic wiping device. Said wiping device can be part of either the applicator or a separate apparatus, arranged downstream the applicator. The wiping device is useful for eliminating any surplus amount of powdery anti-friction agent from the surfaces of the transmission elements and/or of the water swellable yarn.

Preferably, the powdery anti-friction agent is talc. Talc is advantageous from the industrial point of view as nontoxic and economical.

Advantageously, the powdery anti-friction agent has a grain size suitable for avoiding microbending phenomena. Preferably, the powdery anti-friction agent has an average grain size diameter $D_{50} \leq 5$ μm.

Preferably, the transmission elements are optical fibers.

BRIEF DESCRIPTION OF THE DRAWING

The invention will be further illustrated hereinafter with reference to the following examples and figures, wherein.

DETAILED DESCRIPTION OF THE PREFERRED EMBODIMENTS

Figure 1:
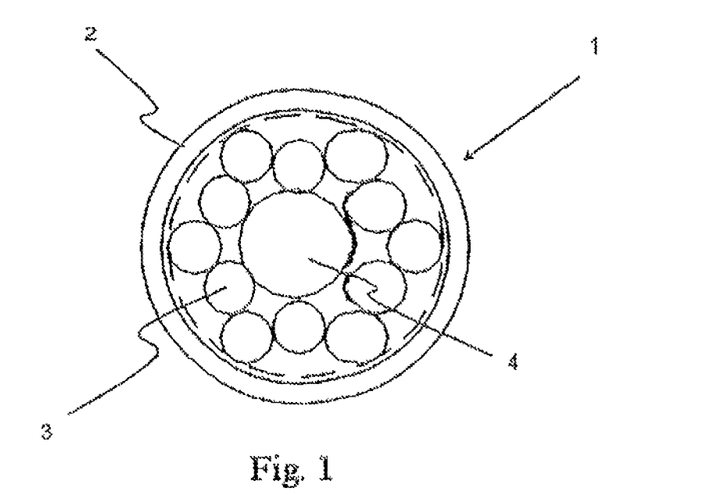
FIG. 1 shows a micromodule of the loose type according to the present invention.

FIG. 1 depicts a micromodule 1 of the loose type according to an embodiment of the invention. The retaining element 2 has an outer diameter of 1.46 mm, an inner diameter of 1.23 mm and a thickness of 0.115 mm. The retaining element 2 encloses twelve transmission elements 3 in form of optical fibers having a diameter of 0.245 mm, and one water swellable yarn 4 with a diameter of 0.5 mm. The water swellable yarn 4 is arbitrarily shown at the center of the retaining element 2, but in the practice it is free to move inside the retaining element as far as permitted by the transmission elements housed therein.

Suitable thermoplastic polymeric materials for the retaining element, according the specific needs, include: α-olefin polymers and copolymers, such as low density polyethylene (LDPE), high density polyethylene (HDPE), linear low density polyethylene (LLDPE), ultra low density polyethylene (ULDPE); polypropylene; high and low density poly-1-butene; poly-4-methyl-1-pentene; ultra; poly-4-methyl-1-pentene; ethylene propylene copolymers; ethylene-propylene-diene copolymers (EPDM); ethylene-1-butylene copolymer, ethylene-vinyl acrylate copolymer, ethylene-methyl acrylate copolymer, ethylene-butyl acrylate copolymer, ethylene-ethyl acetate copolymer, ethylene-vinyl acetate copolymer, propylene-4-methyl-1-pentene copolymer, ethylene-vinyl alcohol copolymer; ethylene-methyl acrylate-acrylic acid terpolymers; or mixtures thereof. Halogenated olefins, polymers and copolymers, may also be used, when absence of halogens is not required. Ethylene-butyl acrylate copolymer, linear low density polyethylene (LLDPE), or mixtures thereof, are preferred.

Examples of olefins that may be used according to the present invention and are available commercially are the product known by the name of Lotryl® from Atofina, Flexirene® from Polimeri Europa.

Advantageously, an inorganic filler (b) is added to the polymeric material. The inorganic filler can include, for example: magnesium hydroxide, aluminum hydroxide, aluminum oxide, kaolin, alumina trihydrate, magnesium carbonate hydrate, magnesium carbonate, magnesium calcium carbonate hydrate, magnesium calcium carbonate, or mixtures thereof. Magnesium hydroxide, aluminum hydroxide, alumina trihydrate ($Al_2O_3.3H_2O$), or mixtures thereof, are particularly preferred.

Examples of inorganic fillers which may be used for the retaining element of the invention and are available commercially are the products known by the name of Hydrofy® from Sima or Atomfor® from Omya.

Other additives, such as processing coadjuvants, lubricants, pigments, other fillers, may advantageously be added to the polymeric material.

Figure 2:
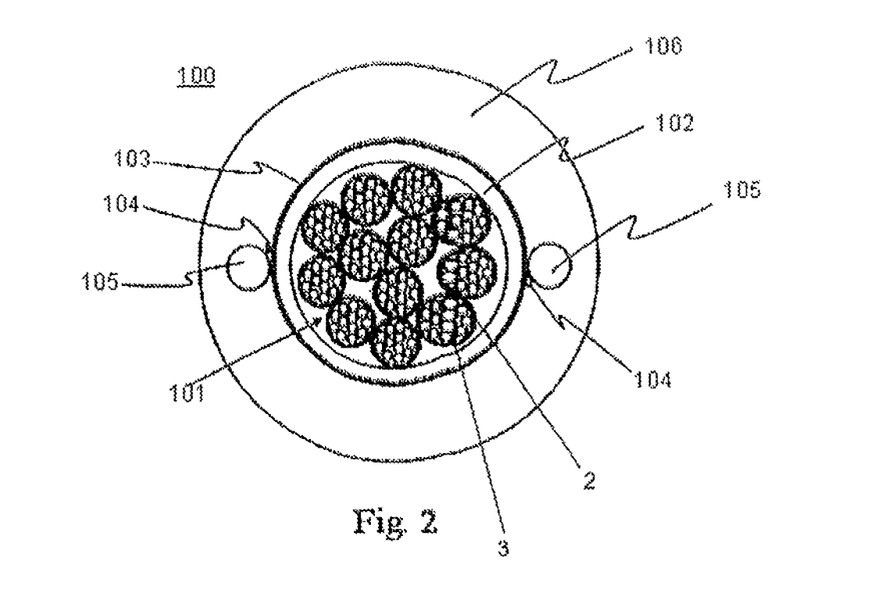
FIG. 2 schematically shows an optical cable according to the invention containing micromodules of the loose type.

FIG. 2 schematically illustrates an optical cable 100 containing twelve micromodules of the loose type 101, housed in a protecting tube 102 of a thermoplastic polymeric material, such as the one known in the art as LS0H (Low Smoke Zero Halogen) or of medium or high density polyethylene (MDPE or HDPE), optionally added with a mineral charge such as magnesium or aluminum hydroxide, and having an inner diameter of 6.4 mm and an outer diameter of 8.4 mm.

A longitudinal tape 103 is applied in radially external position over the protecting tube 102, and separates the latter from sheath 106. Sheath 106 can be of MDPE or HDPE, optionally added with mineral charge, or of a LS0H material. In the present instance the sheath thickness is of 2.30 mm.

The longitudinal tape 103 eases the stripping-off of sheath 106 from the protecting tube 102 during the cable termination. Two ripcords 104 are provided in contact with the longitudinal tape 103, embedded in the sheath 106, and in diametrically opposite position each other.

Longitudinal reinforcements 105 are embedded in sheath 106, parallel each other. Said longitudinal reinforcements 105 restrain longitudinal alterations of the cable due to thermomechanical stresses. Preferably, the longitudinal reinforcements 105 are tangentially positioned with respect to the circumference of the inner diameter of sheath 106 so as to minimize the cable dimension. In the present instance, the diameter of the longitudinal reinforcement 105 is of 1.6 mm. The material of these components can be selected, e.g., from glass fiber reinforced plastic, aramid/resin (aramid: aromatic polyamide) or steel.

Figure 3:
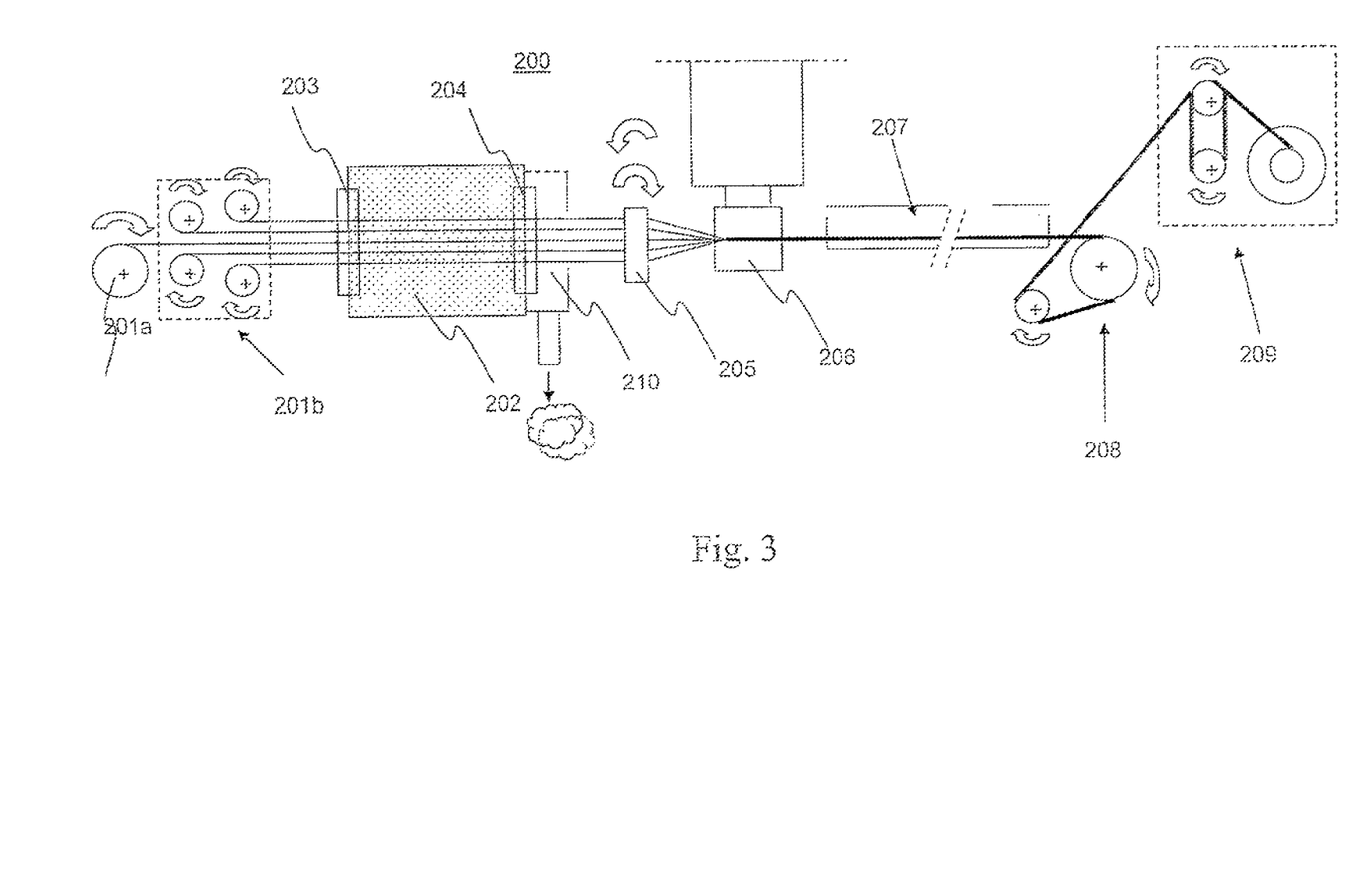
FIG. 3 schematically illustrates an apparatus for performing the process according to the present invention.

The process for the manufacturing the cable is described in the following with reference to the manufacturing apparatus 200, schematically depicted in FIG. 3. Pay-off standings 201a,201b are provided for unwinding, respectively, a water swellable yarn and a number of transmission elements, four in the present case. Water swellable yarn and the transmissive elements are conveyed towards a talc applicator 202 provided with inlet and outlet stationary distributor plates 203,204, for guiding and maintaining reciprocal positioning among the transmission elements and the water swellable yarn. The talc applicator 202 is advantageously provided in downstream position with a pneumatic wiping device 210 suitable for eliminating any surplus amount of talc from the surfaces of the fibers and of the water swellable yarn.

The tensile load applied to the optical fibers is usually in the range of from 50 to 100 g, and the tensile load applied to the water swellable yarn is typically of the same order of magnitude.

The presence of the talc enables a relative movement to take place among the optic unit components, i.e. fibers, water swellable yarn and retaining elements, avoiding or at least reducing the possibility that unacceptable mechanical stresses are transmitted among the optic unit components as a result of different payoff back tensions or of different elongation/contraction loads.

Talc has been found particularly suitable, particularly because no significant microbending effect is detected in connection with its use in the resulting cable. Absence of significant microbending effects has been found privileged with an average powder grain size diameter $D_{50} \leq 5$ μm.

$D_{50}$ means that the 50% of the material passed a sieve of a predetermined size (5 μm in the case).

After the application of the powdery anti-friction agent, the transmission elements and the water swellable yarn are conveyed to a distributor plate 205, preferably motorized, where they are stranded in an SZ stranding lay. For example, for twelve transmission elements and one water swellable yarn, the distributor plate 205 can provide a geometrical positioning 1+6+6.

The bundle resulting from the distributor plate 205 enters in an extruder 206 where it is inserted into a retaining element to provide, e.g., a micromodule. Said extruder 206 comprises an extrusion head, the distance between the stranding device and the extrusion head being comprised between 280 mm and 700 mm. The micromodule is then made to pass through a cooling through 207, that comprises water at a temperature, advantageously, of 20° C. The micromodule is then driven to a take-up system 209 by a line-pulling capstan 208.

EXAMPLE 1

Optical Cables

Three optical cables with the design of FIG. 2 and an external diameter of 13.8 mm were manufactured with water-blocked micromodules, according to the following specifications:

protecting tube of HDPE internally buffered with water swellable powder and talc; the protecting tube had an outer diameter of 6.1 mm and an inner diameter of 4.6 mm;

reinforcing armor provided in radially external position over the sheath, and made of glass fibers, containing filaments treated with water swellable powder;

water swellable longitudinal tape;

two ripcords;

two longitudinal reinforcements hi glass fiber reinforced plastic having a diameter of 1.7 mm;

thermoplastic sheath enveloping the longitudinal reinforcements, being made of HDPE with a thickness of about 2.4 mm;

four micromodules SZ stranded with an oscillation angle of ±280° and a pitch of 2 m, each comprising:

twelve optical fibers Pirelli NEON each having a diameter of about 0.245 mm;

a retaining element of LS0H material, based on LLDPE and EVA as thermoplastic polymeric materials and magnesium hydroxide as inorganic filler, having diameters and inner volume according to Table 3; and one water swellable yarn as from the following Table 1.

TABLE 1

| Cable | Water swellable yarn | $V_w$ [mm³/m] | Swelling after 2 minutes (%) |
|---|---|---|---|
| 1 | GTB 150 (667 dTex) | 3023 | 100 |
| 2 | GTB 200 (500 dTex) | 1915 | 100 |
| 3 | Twaron ® 1052 (1750dTex) | 1897 | 88 |

Swelling volume $V_w$ and swelling percentage in time (swelling speed) were evaluated by means of a cylindrical container (diameter=75 mm) housing a piston with known weight (60 g), the latter being free to vertically move. A known length of the water swellable yarn to test (dry sample) was positioned between the piston and the bottom of the cylindrical container, to compose a monolayered warp. The yarn was left to swell in contact with bidistilled water flowing through holes in the piston base. A micrometric comparator measured the movement of the piston during the time.

The water swellable yarns were also tested for their mechanical characteristics. The results are set forth in Table 2.

TABLE 2

| Cable | Water swellable yarn | Ultimate tensile strength (N) | Elongation at break (%) |
|---|---|---|---|
| 1 | GTB 150 | 7 | 11 |
| 2 | GTB 200 | 6 | 11 |
| 3 | Twaron ® 1052 | 350 | 2.7 |

GTB 150-667 dTex and GTB 200-500 dTex are water swellable yarns composed by polyacrylate swellable fibers on polyester support fibers (Geca-Tapes). Twaron ®1052-1570dTex is a water swellable yarn impregnated with a super-absorbing polymer (Twaron Products V.o.F., The Netherlands).

EXAMPLE 2

Water Propagation Tests Along Water-Blocked Micromodules

The water propagation tests were performed according to the method F5B provided by international standard IEC 60794-1-2 (2001). In particular, the resistance to water propagation along the micromodules was evaluated by applying 1 m water head for 24 hours at an end of micromodule samples having length from 1 to 4 m. The cable samples contain micromodules as identified in Example 1, but with different number of optical fibers, as specified in the test results and comments.

It was noticed that micromodule samples with the same features in term of water swellable yarn and number of optical fibers, but with different lengths did not provide significantly different test results.

Tests were effected on micromodules containing one water swellable yarn and a number of optical fibers ranging from 1 to 12, as well as the water swellable yarn only. The inner volume $V_i$ of each tested retaining element remained unchanged while varying the number of transmission elements housed therein and, accordingly, the free volume per fiber $V_f$.

Figure 4:
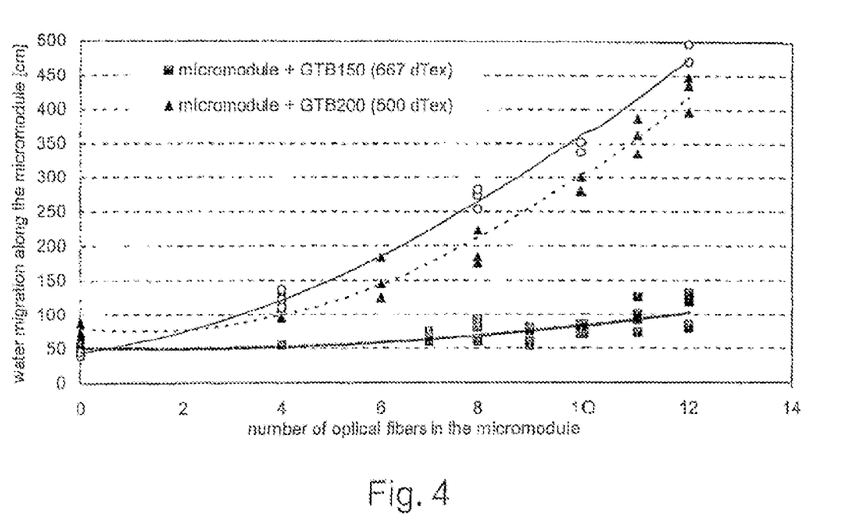
FIGS. 4 and 5 illustrates water propagation test results.
Figure 5:
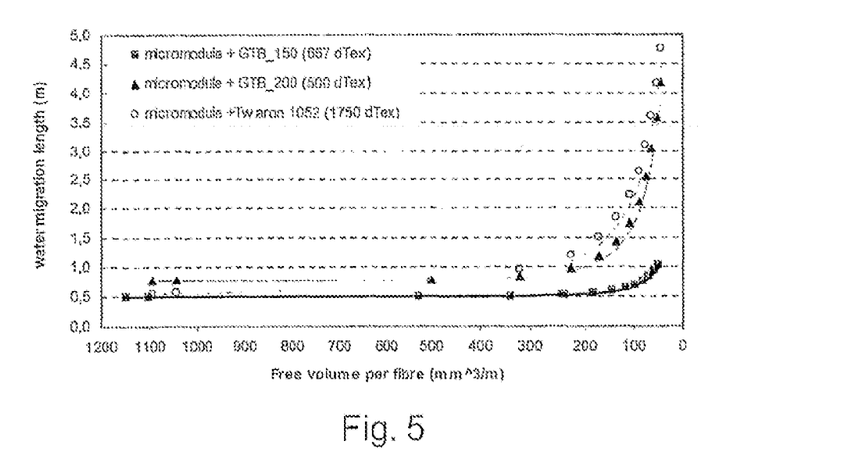

FIGS. 4 and 5 show the results of the series of tests performed on cables according to Example 1. For each cable type, identified by both the water swellable yarn type and the number of fibers housed in the micromodule, No. 8 micromodule samples have been tested and the reported values are the average of the single test results.

The water blocking effect performed by each water swellable yarn tested was satisfactory in the absence of optical fibers in the micromodule. Increasing the optical fiber number housed in the micromodule, the water propagation lengthened. This is surprising because contrary to the hypothesis that the water propagation should be reduced by progressively decreasing the clearance (the total free volume $V_{TF}$ and the free volume per fiber $V_t$) left to the water longitudinal propagation.

In particular, FIG. 4 shows the influence of the transmission element number over the water blocking capacity of the water swellable yarn. By increasing the number of transmission elements, the water propagation along each micromodule increased. In cable 1 containing the GTB 150 as water swellable yarn, the water propagation was confined in about 1 m even when the transmission elements amounted to 12; in the other cables, containing water swellable yarn having a $V_w$ remarkably smaller than that of GTB150, such a limited water penetration was observed with a number of transmission elements up to 3-4.

Tests for cable 1 went on for 14 days (test suspended at the 15$^{th}$ day) and the water propagation never reached the 200 cm length. More specifically, cable 1 samples containing 12 optical fibers showed top water propagation length of 68-145 cm after 14 day-test.

FIG. 5 show that the water propagation along the tested micromodules changes as a function of the free volume per fiber $V_t$. The addition of optical fibers progressively reduced $V_t$. The swelling volume of the water swellable yarn is one of the factors limiting the water propagation. The chart of FIG. 5 attests that water swellable yarns with lower $V_w$ can efficiently perform only for free volume per transmission element $V_t$ larger than the predetermined value.

The following Table 3 summarizes the geometrical characteristics of the micromodule components, the volume relationship described by the equation of the invention, and the results obtained from the water propagation tests.

TABLE 3

Figure 6:
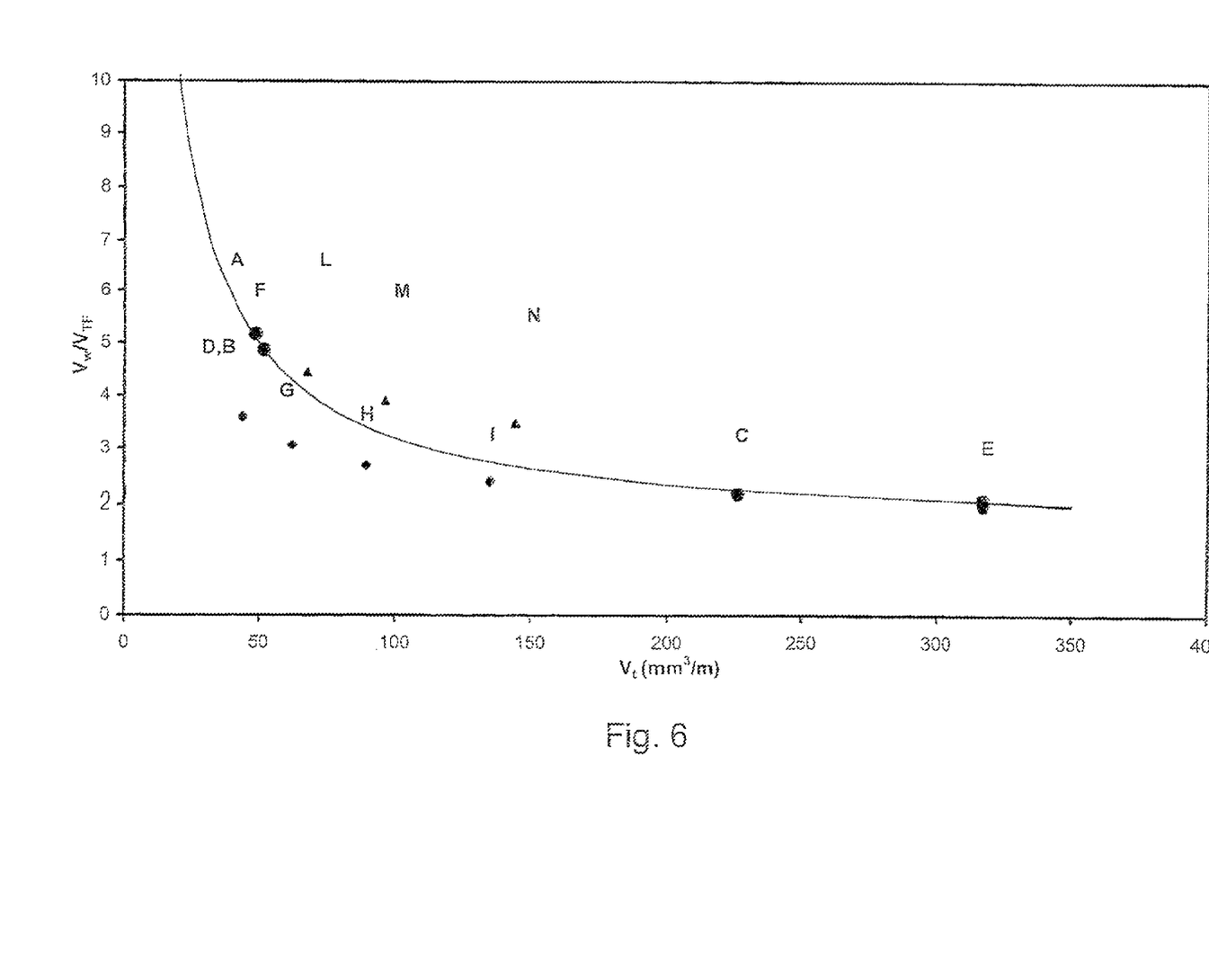
FIG. 6 illustrates a plot of the relationship according the invention.

| Retaining element OD/ID [mm] | $V_i$ [mm³/m] | Water swellable yarn $V_w$ [mm³/m] | m | $V_f \times m$ [mm³/m] | $V_t$ [mm³/m] | $V_{TF}$ [mm³/m] | $V_w/V_{TF}$ | Water propagation length (average) [m] | ID FIG. 6 |
|---|---|---|---|---|---|---|---|---|---|
| 1.46/1.21 | 1149.9 | GTB150 3023 | 12 | 565.7 | 48.68 | 584.2 | 5.17 | <u>1.02</u> | A |
|  |  |  | 10 | 471.4 | 67.85 | 678.5 | 4.45 | <u>0.84</u> | L |
|  |  |  | 8 | 377.1 | 96.59 | 772.8 | 3.91 | <u>0.69</u> | M |
|  |  |  | 6 | 282.6 | 144.51 | 867.0 | 3.49 | <u>0.59</u> | N |
| 1.46/1.18 | 1093.59 | GTB200 1915 | 12 | 565.7 | 43.99 | 527.9 | 3.63 | 4.19 | B |
|  |  |  | 10 | 471.4 | 62.22 | 622.2 | 3.06 | 3.04 | G |
|  |  |  | 8 | 377.1 | 89.55 | 716.4 | 2.67 | 2.12 | H |
|  |  |  | 6 | 282.6 | 135.12 | 810.7 | 2.36 | 1.44 | I |
|  |  |  | 4 | 188.6 | 226.25 | 905.0 | 2.12 | <u>0.99</u> | C |
| 1.46/1.18 | 1093.59 | Twaron ® 1897 | 12 | 565.7 | 43.99 | 547.9 | 3.56 | 4.75 | D |
|  |  |  | 3 | 141.4 | 317.39 | 952.2 | 1.99 | <u>0.96</u> | E |
| 1.46/1.23 | 1188.23 | GTB150 3023 | 12 | 565.7 | 51.88 | 622.5 | 4.86 | <u>1.02</u> | F |

OD = outer diameter
ID = inner diameter
The Twaron ® yarn is a 1052 type as from previous Table 1 and 2.
The water propagation data underlined are those according to the F5B of international standard IEC 60794-1-2 (2001).

FIG. 6 illustrates the relationship $V_w/V_{TF}$ as a function of the free volume per fiber $V_t$ which, in turn, depends on the number of transmission elements housed in the retaining element. The curve in FIG. 6 is for equation (1) of the invention wherein k=182 and R=1,42. Some of the points of FIG. 6 correspond to the experiments detailed in Table 3 and are identified by the ID letter. The points D, B, G, H, and I, below the curve, correspond to experiments resulting in a water migration appreciably longer than 1 m. The points L, M, and N, above the curve, correspond to experiments resulting in a water migration shorter than 1 m.

In particular, for high $V_t$ values, typical of loose tube design, $V_w/V_{TF}$ is nearly constant, whereas for low $V_t$ values, typical of the micromodule construction, $V_w/V_{TF}$ is strongly affected by the variation of $V_t$. At constant $V_{TF}$, the behavior is significantly different in case of few transmission elements or many transmission elements housed in the retaining element.

The invention claimed is:

1. A process for manufacturing an optical cable comprising a retaining element housing at least two individual optical fibers and a water swellable yarn, said process comprising the steps of:
   applying a powdery anti-friction agent over the individual optical fibers by advancing the individual optical fibers and the water swellable yarn through a powdery anti-friction agent applicator while shielding the water swellable yarn from the powdery anti-friction agent applicator;
   bundling together the individual optical fibers and the water swellable yarn to form a bundle, wherein said step of bundling together is carried out after said step of applying; and
   extruding the retaining element around said bundle.

2. The process according to claim 1, wherein the step of bundling together the individual optical fibers and the water swellable yarn comprises the step of stranding the individual optical fibers and the water swellable yarn.

3. The process according to claim 2, wherein the stranding step is an SZ stranding step.

4. The process according to claim 1, wherein the powdery anti-friction agent is talc.

5. The process according to claim 1, wherein the powdery anti-friction agent has an average grain size diameter $D_{50} \leq 5$ µm.

6. The process according to claim 1, comprising the step of eliminating a surplus of powdery anti-friction agent from the surfaces of at least one of individual optical fibers and water swellable yarn.

7. The process according to claim 1, further comprising the step of guiding and maintaining a spaced relationship among said individual optical fibers and the water swellable yarn while advancing through said applicator.

* * * * *